United States Patent [19]
Perez

[11] 3,822,687
[45] July 9, 1974

[54] FUEL FEED DEVICE FOR GAS-OPERATED INTERNAL COMBUSTION ENGINES

[75] Inventor: Jean Perez, Levallois-Perret, France

[73] Assignees: Automobiles Peugeot, Paris; Regie Nationale Des Usines Renault, Billancourt, both of, France

[22] Filed: Feb. 20, 1973

[21] Appl. No.: 333,569

[30] Foreign Application Priority Data
Feb. 29, 1972 France .................... 72.6798

[52] U.S. Cl. .................... 123/198 DB, 123/97 B
[51] Int. Cl. .................... F02d 33/00
[58] Field of Search .................... 123/97 B, 198 DB

[56] References Cited
UNITED STATES PATENTS
2,129,608  9/1938  Vanderpoel .................... 123/97 B
2,386,340  10/1945  Olson .................... 123/97 B
2,877,997  3/1959  Kane, Jr. et al. .................... 123/97 B X
3,256,870  6/1966  Walker .................... 123/97 B

*Primary Examiner*—Charles J. Myhre
*Assistant Examiner*—Tony Argenbright
*Attorney, Agent, or Firm*—Burns, Doane, Swecker & Mathis

[57] ABSTRACT

The device comprises an induction pipe for the engine, first means for regulating the flow of gaseous fuel and controlled by a parameter representing the magnitude of the flow of air in the induction pipe and second means for regulating the flow of gaseous fuel connected in series with the first means. The second means is controlled in accordance with the magnitude of the depression prevailing in the induction pipe.

5 Claims, 6 Drawing Figures

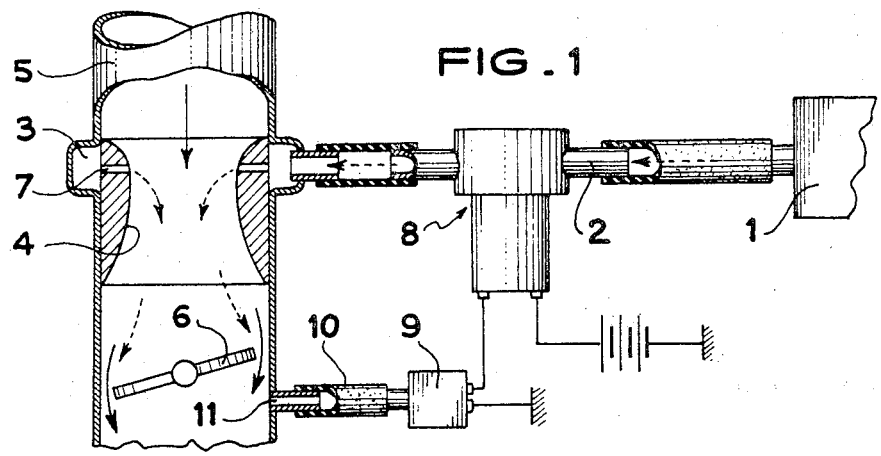
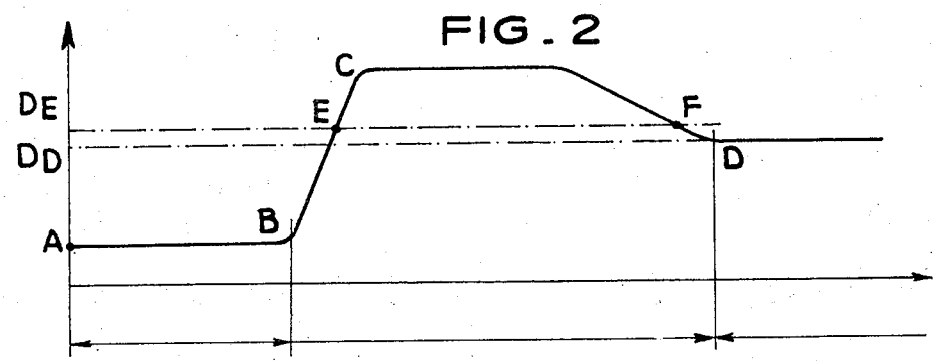
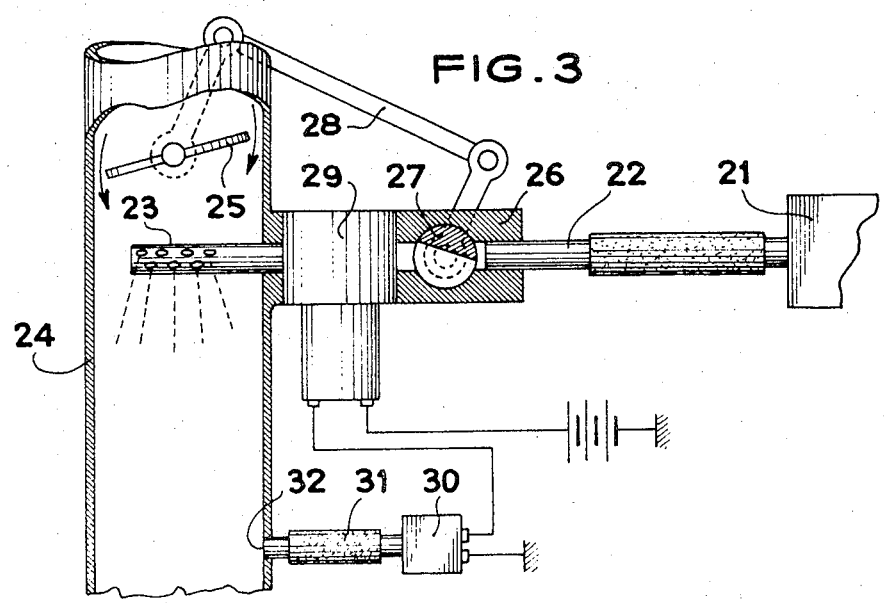

FUEL FEED DEVICE FOR GAS-OPERATED INTERNAL COMBUSTION ENGINES

The present invention relates to devices feeding gas to internal combustion engines and in particular engines in which the source of energy is constituted by gas of liquefied oil.

It is known that the use of gas as fuel fed to internal combustion engines permits obtaining exhaust emissions which have a relatively low pollutant content with simpler means than with petrol or gasolene engines. In the known devices, the flow of gas is controlled by the flow of air either by causing the gas supply pipe to open onto the neck portion of a venturi placed in the air pipe upstream of the throttle member regulating the flow of the mixture or by acting on the section of the passage of the gas supply pipe by means of a tap connected to the throttle member regulating the air flow under which throttle member said gas pipe opens into the air pipe.

Unfortunately, these devices are very incorrect in operation in the course of the stages of deceleration when the accelerator pedal is suddenly released. Indeed, in this stage of operation, the air/gas ratio of the carburated mixture departs from the limits within which combustion is total and there is obtained a mixture which is either too rich resulting in an incomplete combustion or too poor and resulting in imperfect combustion. In both cases, there is an increase in the unburnt products and sometimes carbon monoxide.

An object of the present invention is to remedy this drawback and to provide a gaseous fuel feed device whereby it is possible to achieve under all conditions of utilisation a very low percentage of pollutant products and in particular unburnt products.

This is achieved by providing, in addition to the conventional regulation of the air flow in the induction pipe, an additional regulation of the gas flow in accordance with the depression prevailing in this induction pipe.

In a first embodiment, the second regulation acts on an all-or-nothing principle and stops the flow of gas when the depression in the induction pipe exceeds a predetermined value. As the combustion is then totally interrupted there can be no unburnt products in the exhaust pipe.

In a second embodiment applicable when the regulation in accordance with the air flow is achieved by means of a rotary closure member, the second regulation is achieved by providing with this first closure member a second rotary closure member which is actuated in accordance with the depression prevailing in the induction pipe.

With this second embodiment, it is possible to correct the gas flow so as to maintain an ideal combustion or completely interrupt the flow so as to stop the combustion.

Another object of the invention is to provide a device whereby it is possible to regulate a flow of fluid in accordance with two parameters which is of utility in particular in the foregoing application.

The invention will be understood from the ensuing description with reference to the accompanying drawings in which:

FIG. 1 represents a first embodiment for effecting an additional regulation on an all-or-nothing principle;

FIG. 2 is a diagram showing an example of the evolution of the value of the depression in the induction pipe;

FIG. 3 represents diagrammatically a second embodiment which also effects a regulation by means of an all-or-nothing method;

Figure 4:
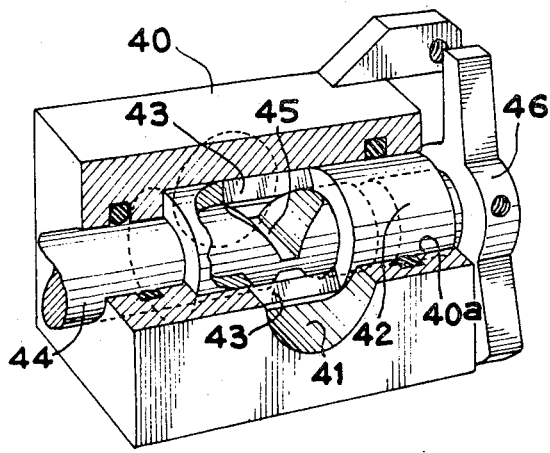
FIG. 4 is a perspective view, with parts cut away, of an improved gas flow regulating device according to the invention.

In the feed device shown in FIG. 1, the fuel gas comes from a pressure reducer 1 placed on the outlet side of a tank (not shown) which may be, for example, a cylinder or bottle of liquefied oil gas. The gas is conducted by a pipe 2 into an annular space 3 disposed around a venturi 4 formed in the air induction pipe 5 upstream of the throttle member 6 which is actuated by the accelerator pedal (not shown). The annular space 3 communicates with the neck of the venturi by way of a series of calibrated orifices 7.

According to the invention, an electrically operated valve 8 is inserted in the gas pipe 2. This valve is electrically connected to a pressure-gauge contact 9 which communicates by way of a conduit 10 with a point 11 in the induction pipe downstream of the throttle member 6.

The diagram shown in FIG. 2 shows the evolution, to a time basis, of the value of the depression in the induction pipe 5 when the engine passes from operation under full load to operation at idling speed after the accelerator pedal has been suddenly released.

The first part AB of the curve, indicating a very low depression, corresponds to the operation under full load, that is to say, with the throttle member fixed in the fully open position.

The part BC shows the sudden increase in the depression at the moment when the throttle member 6 is closed and the engine has not had time to slow down and that a suction is produced in the part of the induction pipe downstream of the throttle member.

The part CD corresponds to the deceleration stage of the engine in the course of which the depression decreases progressively until it reaches the value of the depression corresponding to the idling speed of the engine.

The device according to the invention operates in the following manner:

So long as the valve 8 is open, the metering of the gas is ensured by the depression in a neck of the venturi 4 which varies in accordance with the air flow in the pipe 5 and which causes the valve (not shown) located at the outlet end of the pressure reducer 1 to be opened to a varying extent. When the depression in the pipe 5 varies along the section BC and reaches a certain level DE, higher than the value of the idling depression DD, the pressure-gauge contact 9 is closed and supplies current to the electrically operated valve 8 which is in turn closed. As the supply of gas has stopped, the combustion stops and consequently any burnt product is purely and simply eliminated.

The speed of the engine then drops progressively and simultaneously brings about a decrease in the depression and, when the speed has sufficiently dropped and point F of the curve shown in FIG. 2 is reached, the pressure-gauge contact 9 is once more opened and causes the opening of the valve 8 and the resumption of the supply of gas to the engine.

In the embodiment shown in FIG. 3, the gas coming from a pressure reducer 21 is conducted by a conduit or pipe 22 to a diffuser 23 placed in the induction pipe 24 downstream of the air throttle member 25.

A tap 26 is inserted in the conduit 22 in which is mounted a rotary closure member 27 connected by a linkage 28 to the spindle of the air throttle member 25. According to the invention, an electrically operated valve 29 is also disposed in the conduit 22 in series with the closure member 26. This valve is connected electrically to a pressure-gauge contact 30 which communicates by way of a conduit 31 with a point 32 in the induction pipe downstream of the throttle member 25.

The device operates in the same way as the previously described device apart from the fact that in normal operation the supply of gas is regulated by the position of the closure member 27 and not by the variation in the depression in the neck of a venturi.

Figure 5:
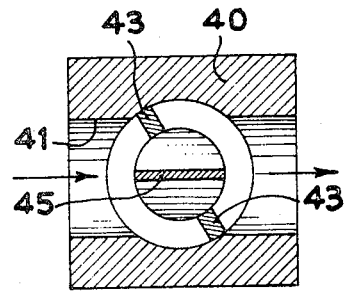
FIG. 5 is a cross-sectional view of the device shown in FIG. 4.
Figure 6:
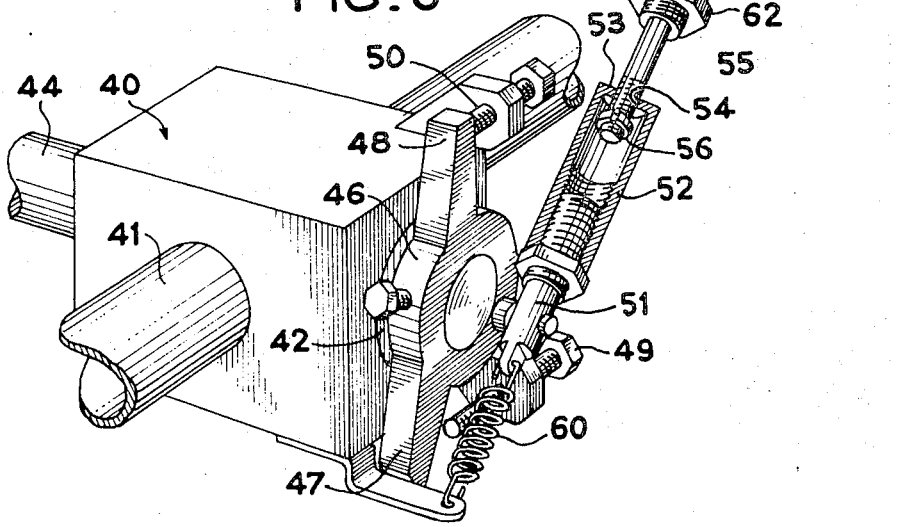
FIG. 6 represents the control mechanism associated with the device shown in FIG. 4.

In the case where the regulating means governed by the air flow is constituted by an adjustable closure member, the second regulating means, governed by the depression in the induction pipe, may be constructed in accordance with the embodiment shown in FIGS. 4-6.

In this embodiment, the elements controlling the gas flow are disposed concentrically in a body 40 which is interposed in the conduit 41 supplying expanded gas. Inside the body 40 there is formed a cavity 40a which is oriented transversely of the conduit 41 and in which is rotatable a sleeve 42 which is limited in the region of the conduit 41 to two diametrally opposed partition walls 43. There may be provided to slide in the sleeve 42 a cylinder 44 which is reduced in the region of the conduit 41 to a partition wall 45 extending along a diameter. The cylinder 44 is mechanically connected to the air flow throttle member, for example by a linkage such as that shown in FIG. 3.

The sleeve 42 is integral with a lever 46 provided with two ear portions 47 and 48 which are capable of abutting screws 49 and 50 respectively. Pivoted to the lever 46 is a rod 51 at the end of which is screwthreadedly engaged a hollow cylinder 52 which terminates, inside the cylinder, in a nut 56. The other end of the rod 51 is integral with a diaphragm 57 of a depression or suction capsule 58 whose chamber 59 is in communication with the induction pipe downstream of the air throttle member. A first return spring 60 tends to return the lever 46 to the position in which the ear portion 48 abuts the screw 50. A second return spring 61, disposed between the capsule 58 and a nut 62, screwthreadedly engaged on the rod 55, tends to oppose the action of the depression on the diaphragm 57.

This structure operates in the following manner:

In respect of relatively low values of depression in the induction pipe, the movement of the diaphragm 57 and of the rod 55 are without effect on the sleeve 42 owing to the clearance or play between the nut 56 and the end wall 53 of the cylinder 52. The sleeve 42 then occupies a position in which its two partition walls 43 are disposed transversely with respect to the conduit 41 and the gas flow is regulated solely by the movement of the partition wall 45 which is related to the movement of the gas throttle member.

If the accelerator pedal is suddenly released while the engine is rotating at high speed, a sudden increase in the depression is produced. The nut 56 of the rod 55 then abuts the end wall 53 of the cylinder 52 and drives the rod 51 which causes the lever 46 and therefore the sleeve 42 to rotate, the partition walls 43 of the sleeve assuming an inclined position determined by the abutment of the ear portion 42 against the screw 49.

Thus, with such a device, it is possible:

to interrupt completely the supply of gas and therefore the combustion. For this it is sufficient that the movement of rotation of the sleeve 42 move the partition walls 43 closer to the partition wall 45 until the passage for the gas is completely closed;

or to correct the gas flow in accordance with the ascertained defect: the movement of rotation of the sleeve 42 then causes, as the case may be, either an increase in the section of passage, and therefore an enrichment of the mixture, or a decrease in the section and a starving of the mixture. The final position of the partition walls 43, determined by the abutment of the ear portion 47 against the screw 49, is easy to regulate by acting on this screw 49.

Having now described my invention what I claim as new and desire to secure by Letters Patent is:

1. A device for feeding fuel to an internal combustion engine comprising an induction pipe for the engine, a first means for regulating the flow of gaseous fuel and controlled by a parameter representing the magnitude of the flow of air passing through the induction pipe, a second means for regulating the flow of gaseous fuel connected in series with the first means, and means for controlling the second means in accordance with the magnitude of the depression prevailing in the induction pipe, the first regulating means comprising a body defining a conduit in the path of the gaseous fuel, a closure member rotatably mounted in the body, means for controlling the angular position of the closure member in accordance with the flow of air in the induction pipe, the second regulating means comprising a second closure member mounted in said body and co operating with the first closure member for selectively totally interrupting the flow of gaseous fuel and effecting a correction of this flow in given conditions of operation.

2. A device as claimed in claim 1, wherein the conduit extends in a first direction and a cylindrical cavity extends transversely of said direction and intersects said conduit, the second closure member has the shape of a cylindrical sleeve received in the cavity and shaped in a region of the conduit to define two radial diametrally opposed partition walls; the first closure member has the shape of a cylinder coaxial with and rotatably mounted in said sleeve and shaped in a region of said conduit to define a partition wall extending along a diameter; respective means being provided for regulating the angular position of the first closure member in accordance with the flow of air in the induction pipe and modifying the angular position of the second closure member in accordance with the depression prevailing in the induction pipe.

3. A device as claimed in claim 1, wherein the second closure member is integral with an actuating lever, suitable means being provided for connecting the lever to an element responsive to the depression prevailing in the induction pipe, and abutments being provided for limiting the angular movement of said lever in both directions.

4. A device as claimed in claim 3, wherein at least one of said abutments is adjustable.

5. A device as claimed in claim 3, wherein the means connecting the actuating lever to the element responsive to the depression are adapted to have a lost travel so that the second closure member is only displaced when the depression in the induction pipe reaches a predetermined value.

* * * * *